(12) United States Patent
Lin et al.

(10) Patent No.: US 7,967,447 B2
(45) Date of Patent: Jun. 28, 2011

(54) OVERHEAT PREVENTION DEVICE

(75) Inventors: Chia-Jui Lin, Taoyuan Hsien (TW); Hui-Chih Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 694 days.

(21) Appl. No.: 11/945,569

(22) Filed: Nov. 27, 2007

(65) Prior Publication Data

US 2009/0034192 A1    Feb. 5, 2009

(30) Foreign Application Priority Data

Aug. 2, 2007  (TW) .............................. 96128408 A

(51) Int. Cl.
*G03B 21/16*  (2006.01)
*G03B 21/18*  (2006.01)
*H04N 5/74*  (2006.01)

(52) U.S. Cl. .............................. 353/58; 353/57; 348/748

(58) Field of Classification Search ..................... 353/52, 353/53, 54, 55, 56, 57, 58, 59, 60, 61; 348/748
See application file for complete search history.

(56) References Cited

U.S. PATENT DOCUMENTS

| | | | |
|---|---|---|---|
| 6,520,647 B2 * | 2/2003 | Raskar | 353/70 |
| 6,686,973 B2 | 2/2004 | Su | |
| 2004/0135977 A1 * | 7/2004 | Ito et al. | 353/122 |
| 2005/0200816 A1 * | 9/2005 | Hsu | 353/57 |
| 2006/0066816 A1 * | 3/2006 | Horiguchi et al. | 353/52 |

* cited by examiner

*Primary Examiner* — Georgia Y Epps
*Assistant Examiner* — Bao-Luan Le
(74) *Attorney, Agent, or Firm* — Grossman, Tucker, Perreault & Pfleger, PLLC

(57) ABSTRACT

An overheat prevention device comprises an inclination angle detector, a cooling module, and a control circuitry. The inclination detector is adapted to detect a first inclination angle and a second inclination angle, which an light source module is subject to relative to a reference plane, and transmit a first inclination signal and a second inclination signal, respectively. In response to the first inclination signal, the control circuitry alters the cooling module from a first operation mode to a second operation mode. In response to the second inclination signal, the control circuitry alters a projection apparatus from the first operation mode to the second operation mode.

14 Claims, 4 Drawing Sheets

OVERHEAT PREVENTION DEVICE

This application claims the benefit of priority based on Taiwan Patent Application No. 096128408, filed on Aug. 2, 2007, the contents of which are incorporated herein by reference in their entirety.

CROSS-REFERENCES TO RELATED APPLICATIONS

Not Applicable.

BACKGROUND OF THE INVENTION

1. Field of the Invention

The present invention relates to an overheat prevention device for use in a projection apparatus.

2. Descriptions of the Related Art

All the ordinary projection apparatuses in the market comprise at least an illumination system and an imaging system. The illumination system is configured to supply homogeneous and concentrated beams to the imaging system, while the imaging system in turn is configured to output an image through the beams. In the illumination system, a high power bulb is typically used to form a light source module, which functions not only as the light source, but also as a main heat source in the projection apparatus (especially for a digital light processing (DLP) projection apparatus). For this reason, manufacturers of the projection apparatuses usually have to work out an effective solution to dissipate the heat generated by the light source module. For example, the heat can be dissipated with a fan or a heat pipe to reduce the operating temperature of the light source module and to prevent damage to both the light source module and the operation of the projection apparatus.

Since hot air rises, there is usually an uneven distribution inside the projection apparatus, so that temperatures at different area of the projection apparatus differ from each other. As a result, during the manufacturing of projection apparatuses, the manufacturers usually optimize the design of a heat dissipation mode based on the temperature distribution inside the projection apparatus that is placed on a flat surface. However, in practicality, rather than being placed on a flat surface, the projection apparatus is often suspended from a ceiling upside down, or is placed slantwise in response to an uneven operating environment.

Because the heat dissipation mode inside a projection apparatus is fixed at the time it was manufactured, when a projection apparatus operates in an inclined manner rather than being placed level on a flat surface, the temperature distribution therein will shift away from a desirable state. In other words, the heat dissipation structure, configured at the time of manufacturing, can not be changed to properly cool down the light source module which is the most prominent heat generating source. As a result, there is damage to the bulb inside the light source module which may lead to a premature end to the service life. More particularly, it will degrade the performance and even cause complete failure of the entire projection apparatus.

Therefore, to meet the expectations of consumers, manufacturers will need to provide an effective heat dissipating approach that will account for the temperature distribution variation inside the projection apparatus due to different placement orientations.

SUMMARY OF THE INVENTION

The primary objective of this invention is to provide an overheat prevention device for use in a projection apparatus. The projection apparatus comprises a light source module. The overheat prevention device comprises an inclination detector, a cooling module, and a control circuitry. The inclination detector is adapted to detect a first inclination angle and a second inclination angle of the light source module relative to a reference plane, and to transmit a first inclination signal and a second inclination signal, respectively. In response to the first inclination signal, the control circuitry alters the cooling module from a first operation mode to a second operation mode. In response to the second inclination signal, the control circuitry alters the projection apparatus from the first operation mode to the second operation mode.

The overheat prevention device described above is adapted to simultaneously detect the first inclination angle and the second inclination angle to alter the operation modes of the cooling module and the projection apparatus respectively. Nevertheless, this invention is not limited to any specific number of detectable inclination angles, and to achieve the alteration of said operation modes, other overheat prevention devices in accordance with this invention may also be adapted to detect one or more than two inclination angles.

Another objective of this invention is to provide an overheat prevention device for use in a heating apparatus. The overheat prevention device comprises an inclination detector, a cooling module and a control circuitry. The inclination detector is adapted to detect an inclination angle of the heating source relative to a reference plane, and transmit an inclination signal in response to the inclination angle. The control circuitry is adapted to alter an operation mode of the cooling module in response to the inclination signal to prevent the overheating of the heating apparatus.

The overheat prevention device described above is adapted to alter the operation mode of the cooling module by detecting an inclination angle, thereby to prevent the heating apparatus from overheating. Nevertheless, this invention is not limited to any specific number of detectable inclination angles, and to alternate operation modes, other overheat prevention devices in accordance with this invention may also be adapted to detect more than two inclination angles.

This invention senses a placement orientation of the projection apparatus based on a detected inclination angle, and transmits an inclination signal to the control circuitry to alter the cooling mode inside the projection apparatus in response to the variation of the temperature distribution therein. This will prevent the overheating of any projection apparatus or any heating apparatus incorporated inside a projection apparatus. In addition, the application and flexibility of the projection apparatus will prevent damage to the various components within the projection apparatus and prolong the service life thereof.

The detailed technology and preferred embodiments implemented for the subject invention are described in the following paragraphs accompanying the appended drawings for the people skilled in this field to well appreciate the features of the claimed invention.

DESCRIPTION OF THE PREFERRED EMBODIMENT

Figure 1:
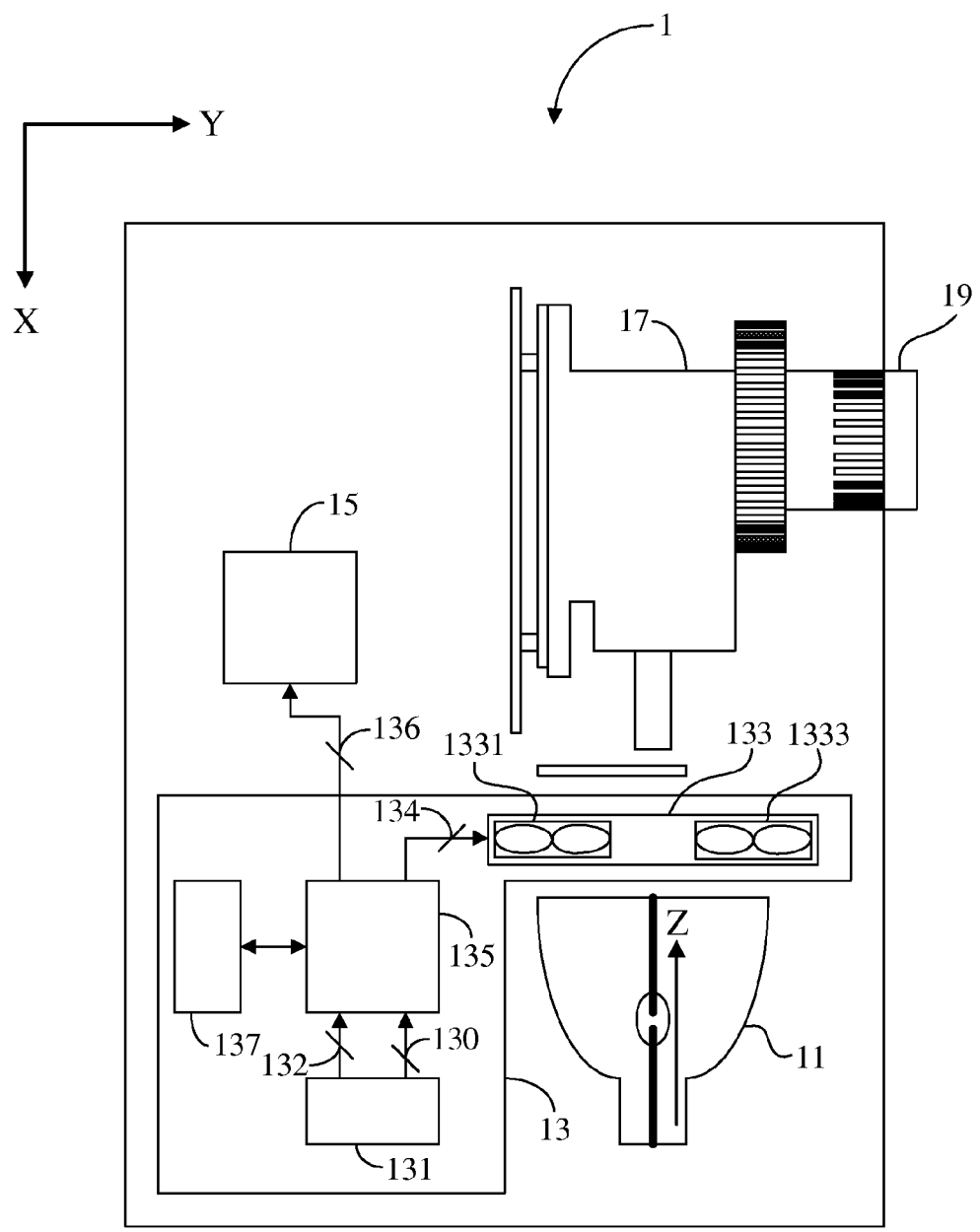
FIG. 1 is a schematic illustrating the plan view of a preferred embodiment of this invention.
Figure 2:
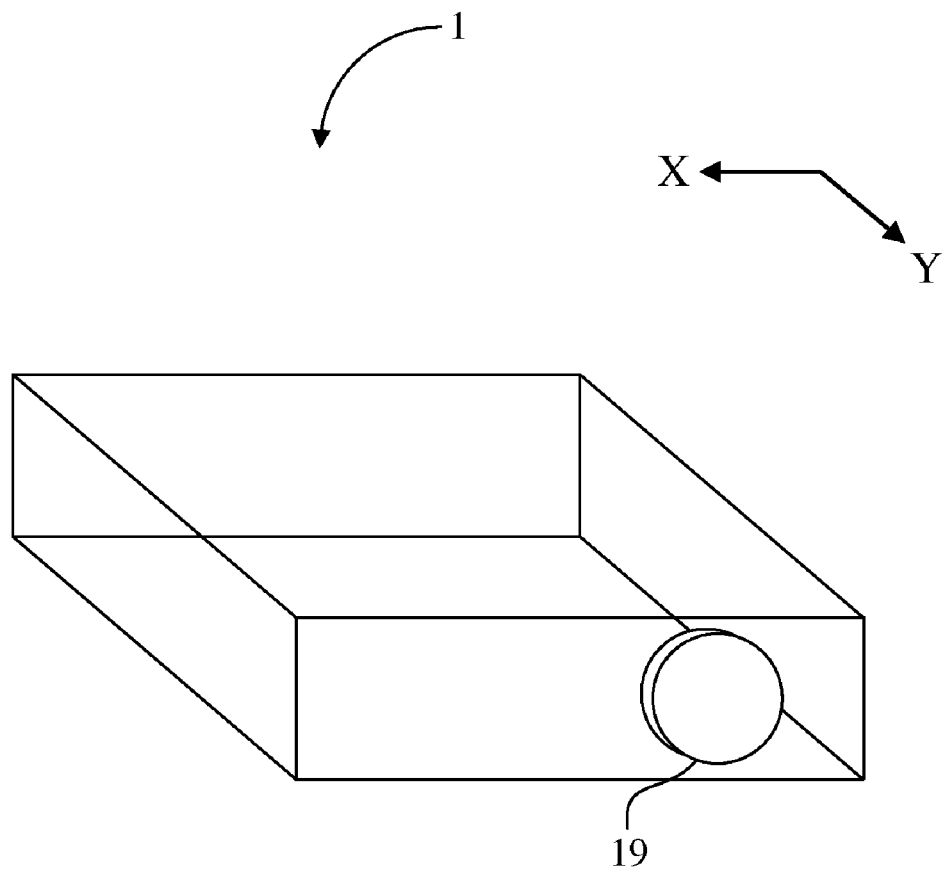
FIG. 2 is a schematic illustrating the perspective view of the preferred embodiment of this invention.

A preferred embodiment of this invention is illustrated in FIG. 1 and FIG. 2, which is a projection apparatus 1. The projection apparatus 1 comprises a light source module 11, an overheat prevention device 13, a power control circuitry 15, an imaging module 17, and a lens 19. The overheat prevention device 13 comprises an inclination detector 131, a cooling module 133, a control circuitry 135, and a memory 137. The cooling module 133 further comprises a first fan 1331 and a second fan 1333. The light source module 11, which is the main heat generating component within the projection apparatus 1, is adapted to project a light beam to the imaging module 17 along a principal optical axis (the Z-axis direction as shown in FIG. 1). The first fan 1331 and the second fan 1333 are disposed symmetrically with respect to the principal optical axis Z of the light source module 11.

Figure 3:
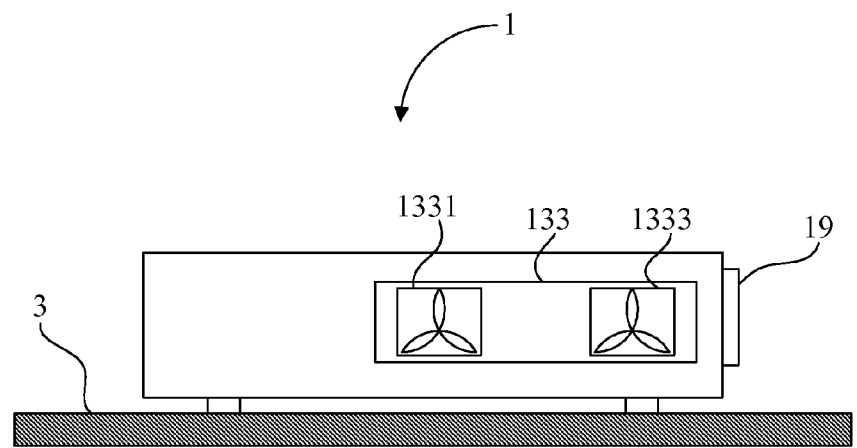
FIG. 3 is a schematic illustrating the side view of a projection apparatus of the preferred embodiment which is placed on a flat surface.
Figure 4:
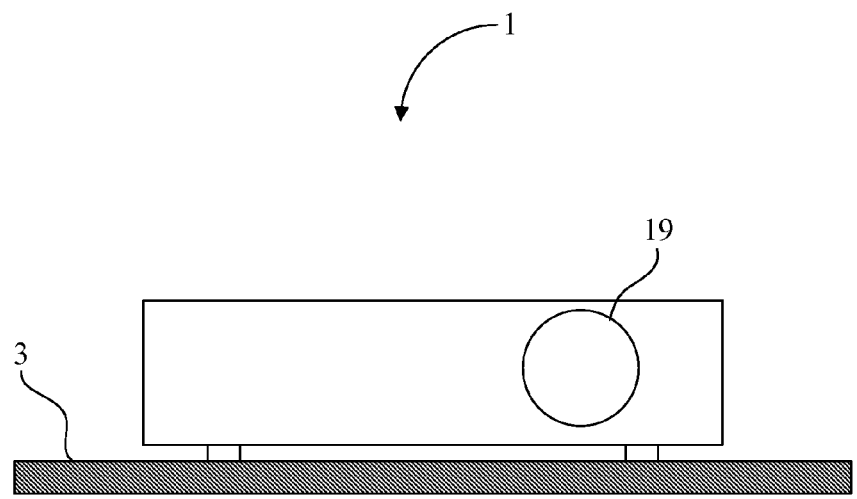
FIG. 4 is a schematic illustrating the front view of the projection apparatus of the preferred embodiment which is placed on a flat surface.

FIG. 3 and FIG. 4 illustrate a side and a front view respectively of the projection apparatus 1 which is placed on a flat surface 3. It should be noted that, the flat surface 3 in this preferred embodiment is a reference plane. At this time, the first fan 1331 and the second fan 1333 of the cooling module 133 operate at a first rotational speed, and the projection apparatus 1 projects an image normally.

Figure 5:
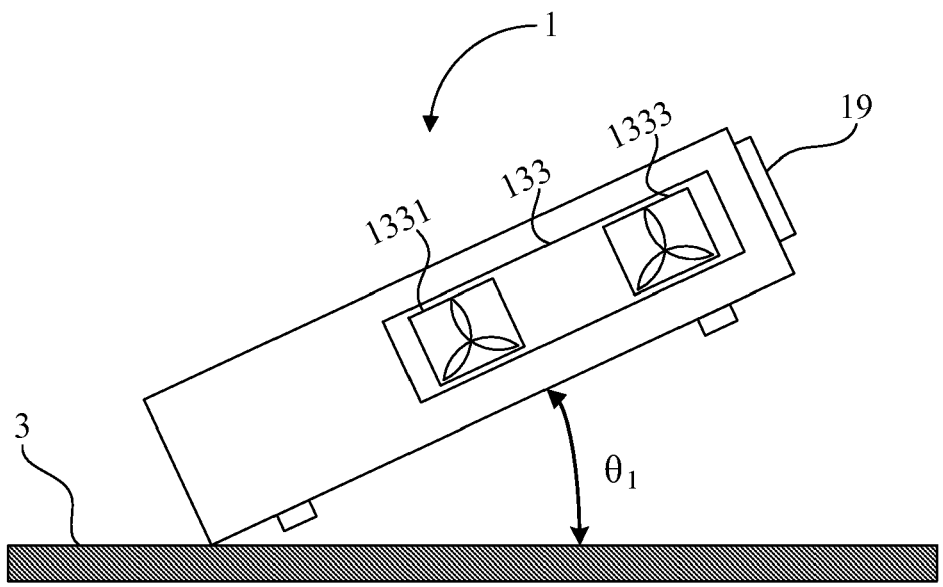
FIG. 5 is a schematic illustrating the side view of the projection apparatus of the preferred embodiment which forms an elevated angle relative to the flat surface.

As shown in FIG. 1, the principal optical axis Z is substantially parallel with a first axis (i.e. the X axis) and perpendicular to a second axis (i.e. the Y axis). As shown in FIG. 5, when the projection apparatus 1 pivot turns about the first axis (i.e. the X axis) to form an elevation angle between the projection direction of the lens 19 and a flat surface 3, a first inclination angle $\theta_1$ will be formed between the projection apparatus 1 and the flat surface 3. At this time, the first inclination angle $\theta_1$ will be detected by the inclination detector 131, which then transmits a first inclination signal 130 based on the first inclination angle $\theta_1$ to the control circuitry 135. In response to the first inclination signal 130, the control circuitry 135 will transmit a first control signal 134 to the cooling module 133 to alter the operation mode of the cooling module 133. Because the property of hot air rising and the first fan 1331 and the second fan 1333 relatively disposed as FIG. 5, the rotational speed of the first fan 1331 will slow down from the first rotational speed to a second rotational speed, while that of the second fan 1333 will rise from the first rotational speed up to a third rotational speed. Thereupon, the temperature inside the projection apparatus 1 and operation of the projection apparatus 1 will be then normally maintained.

Figure 6:
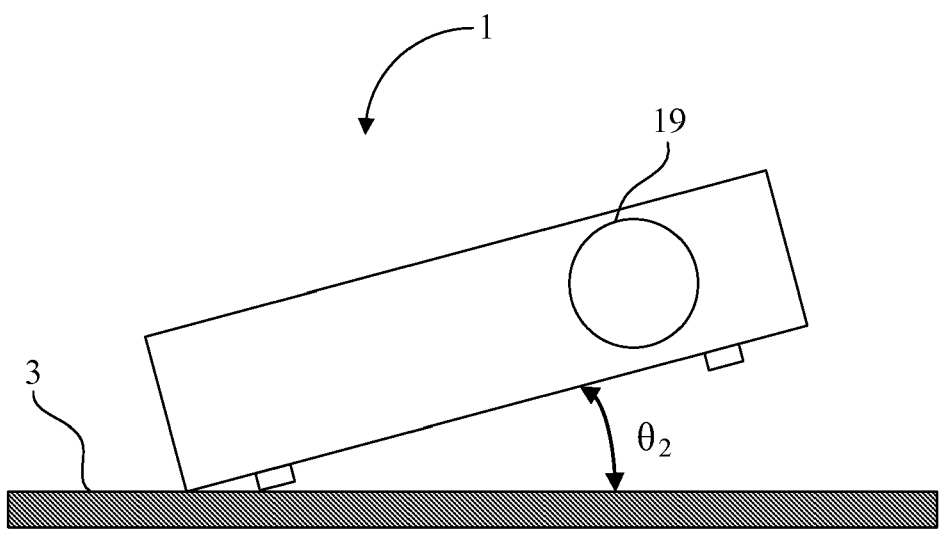
FIG. 6 is a schematic illustrating the front view of the projection apparatus of the preferred embodiment which forms a side inclination angle relative to the flat surface.

In contrast, when the projection apparatus 1 pivot turns about the second axis (i.e. the Y axis) which is substantially perpendicular to the principal optical axis Z to form a side inclination angle, the positions of the projection apparatus 1 and the flat surface 3 relative to each other are illustrated in FIG. 6. At this time, a second inclination angle $\theta_2$ will be formed between the projection apparatus 1 and the flat surface 3. The second inclination angle $\theta_2$ will be detected by the inclination detector 131, which then transmits a second inclination signal 132 based on the second inclination angle $\theta_2$ to the control circuitry 135. Further, as the projection apparatus 1 turns about the Y axis, the bulb of the light source module 11 will incline at the second inclination angle $\theta_2$, which may lead to burn-out or a shorter service life of the bulb to result in a failure of the projection apparatus 1. In view of this, the control circuitry 135 will, in response to the second inclination signal 132, transmit a second control signal 136 to the power control circuitry 15 of the projection apparatus 1 to alter the operation mode of the projection apparatus 1. That is, the power control circuitry 15 will shut down the projection apparatus 1 after a predetermined time period, so that the bulb of the light source module 11 will not burn out.

After the control circuitry 135 receives the first inclination signal 130 and the second inclination signal 132, it will read a lookup table (not shown) stored in the memory 137 to properly alter the operation modes of the cooling module 133 and the projection apparatus 1. The lookup table is adapted to record the relationship among the rotational speed of the first fan 1331, the rotational speed of the second fan 1333, and the first inclination angle $\theta_1$ formed between the projection apparatus 1 and the flat surface 3. In addition, the lookup table is also adapted to record the relationship between the predetermined time period after which the projection apparatus 1 must be shut down and the second inclination angle $\theta_2$ formed between the projection apparatus 1 and the flat surface 3. In other words, the rotational speeds of the first fan 1331 and the second fan 1333 will be changed to properly alter the operation modes according to the first inclination angle $\theta_1$. Similarly, the predetermined time period after which the projection apparatus 1 must be shut down also changes to properly alter the operation modes according to the second inclination angle $\theta_2$. All the values contained in the lookup table described above correspond to the preferred or optimized operation modes of the cooling module 133 that are already known, and will not be described in more detail herein.

Furthermore, in the lookup table stored in the memory, the first inclination angel $\theta_1$ may be divided into six segments (for example, every 60 degrees corresponds to each segment), and the rotational speeds of the first fan 1331 and the second fan 1333 of the cooling module 133 may be respectively set in response to each different segment. Moreover, the predetermined time period after which the projection apparatus 1 must be shut down is adjusted depending on the second inclination angle $\theta_2$. For example, when the second inclination angle $\theta_2$ exceeds ±10 degrees, the projection apparatus 1 will be shut down after a time period of 30 seconds. However, when the second inclination angle $\theta_2$ exceeds ±20 degrees, the projection apparatus 1 will be shut down immediately to prevent the bulb of the light source module 11 from burning out.

Although the inclination detector 131 in this embodiment is adapted to detect two inclination angles as a basis to alter the operation modes of the cooling module 133 and the projection apparatus 1, this invention is not limited to only two inclination angles. Instead, this invention may also be modified to detect only one or more than two inclination angles. Those of ordinary skill in the art may readily appreciate how to alter the operation modes of the cooling module 133 and the projection apparatus 1 in other embodiments based on description of the above preferred embodiment. Thus, this will not be described in more detail herein.

This invention is also not limited to the number of segments of the first inclination angle $\theta_1$ and the predetermined time period after which the projection apparatus 1 must be shut down in case the second inclination angle $\theta_2$ arises. Other aspects will readily occur to those of ordinary skill in the art upon reviewing the above description, and therefore will not be described in more detail herein. Moreover, the cooling module 133 does not need to be disposed only in front of the light source module 11. Rather, it may also be disposed at other locations inside the projection apparatus 1 to cool the projection apparatus 1, so that other components of the projection apparatus 1 will not be damaged.

It follows from the above descriptions that, this invention senses the placement orientation of the projection apparatus by detecting an inclination angle, and transmitting the inclination signal to the control circuitry to alter the cooling mode inside the projection apparatus or shut down the entire projection apparatus completely in response to the variation of the temperature distribution within the projection apparatus. In this way, a continuously high temperature that would otherwise damage the light source module can be prevented, thereby to avoid overheating of the projection apparatus and enhance the application and flexibility thereof, so that other components within the projection apparatus will not be damaged and the service life thereof will be prolonged.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An overheat prevention device for use in a projection apparatus, the projection apparatus comprising a light source module and a power circuitry, the overheat prevention device comprising:
   an inclination detector adapted to detect an inclination angle, greater than 0 and less than 90 degrees, of the light source module relative to a reference plane, and transmit an inclination signal according to the inclination angle;
   a cooling module, comprising a first fan and a second fan; and
   a control circuitry, which connects with the inclination detector and the cooling module, for controlling one of the cooling module and the power circuitry to alter an operation mode of the projection apparatus in response to the inclination signal;
   wherein the control circuitry controls the cooling module by controlling the first fan from a first rotational speed down to a second rotational speed and controlling the second fan from the first rotational speed up to a third rotational speed in response to the inclination signal.

2. The overheat prevention device as claimed in claim 1, wherein the light source module is adapted to project light along a principal optical axis, and the inclination angle is formed by the projection apparatus rotating along an axis being substantially parallel with the principal optical axis.

3. The overheat prevention device as claimed in claim 1, wherein the first fan and the second fan are symmetrically installed, in association with the principal optical axis, on two opposite sides of the light source module.

4. The overheat prevention device as claimed in claim 1, further comprising a memory for storing a lookup table, wherein the lookup table is adapted to record relationship among the second rotational speed, the third rotational speed, and the inclination angle.

5. The overheat prevention device as claimed in claim 1, wherein the light source module projects light along a principal optical axis, and the inclination angle is formed by the projection apparatus rotating along an axis being substantially perpendicular to the principal optical axis.

6. The overheat prevention device as claimed in claim 5, wherein the control circuitry is adapted to control the power circuitry in response to the inclination signal to shut down the projection apparatus after a predetermined time period.

7. The overheat prevention device as claimed in claim 6, further comprising a memory for storing a lookup table, wherein the lookup table is adapted to record relationship between the predetermined time period and the inclination angle.

8. An overheat prevention device for use in a projection apparatus, the projection apparatus comprising a light source module, the overheat prevention device comprising:
   an inclination detector adapted to detect a first and a second inclination angle, greater than 0 and less than 90 degrees, of the light source module relative to a reference plane, and transmit a first and a second inclination signal respectively;
   a cooling module, comprising a first fan and a second fan; and
   a control circuitry, which connects with the inclination detector and the cooling module, for controlling the first fan from a first rotational speed down to a second rotational speed and controlling the second fan from the first rotational speed up to a third rotational speed in response to the first inclination signal, and for controlling the projection apparatus to shut down after a predetermined time period in response to the second inclination signal.

9. The overheat prevention device as claimed in claim 8, wherein the light source module is adapted to project light along a principal optical axis, the first inclination angle is formed by the projection apparatus rotating along a first axis being substantially parallel with the principal optical axis, and the second inclination angle is formed by the projection apparatus rotating along a second axis being substantially perpendicular to the principal optical axis.

10. The overheat prevention device as claimed in claim 8, wherein the first fan and the second fan are symmetrically installed, in association with the principal optical axis, on two opposite sides of the light source module.

11. The overheat prevention device as claimed in claim 8, further comprising a memory for storing a lookup table, wherein the lookup table is adapted to record relationship among the second rotational speed, the third rotational speed, and the first inclination angle, and record relationship between the predetermined time period and the second inclination angle.

12. An overheat prevention device for use in a heating apparatus, the overheat prevention device comprising:
   an inclination detector adapted to detect an inclination angle, greater than 0 and less than 90 degrees, of the heating apparatus relative to a reference plane, and transmit an inclination signal according to the inclination angle; a cooling module, comprising a first fan and a second fan: and
   a control circuitry for controlling the first fan from a first rotational speed down to a second rotational speed, controlling the second fan from the first rotational speed up to a third rotational speed, and altering an operation mode of the cooling module to prevent overheat of the heating apparatus in response to the inclination signal.

13. The overheat prevention device as claimed in claim 12, wherein the first fan and the second fan are symmetrically installed on two opposite sides of the heating apparatus.

14. The overheat prevention device as claimed in claim 12, further comprising a memory for storing a lookup table, wherein the lookup table is adapted to record relationship among the second rotational speed, the third rotational speed, and the inclination angle.

* * * * *